J. J. Wood,
Cage Trap.
No. 107,844.        Patented Sep. 27, 1870.
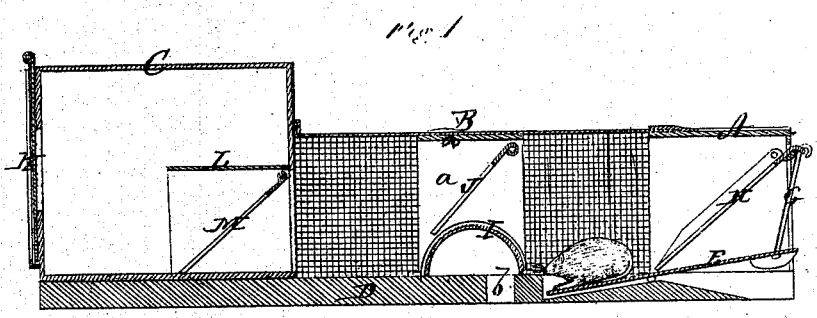
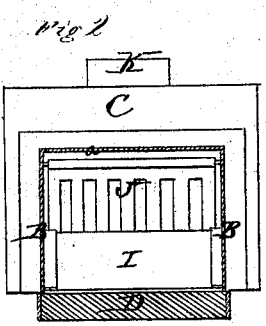

United States Patent Office.

JOHN J. WOOD, OF NORTH MANCHESTER, INDIANA.

Letters Patent No. 107,844, dated September 27, 1870; antedated September 17, 1870.

IMPROVEMENT IN ANIMAL-TRAPS.

The Schedule referred to in these Letters Patent and making part of the same.

*To all whom it may concern:*

Be it known that I, JOHN J. WOOD, of North Manchester, in the county of Wabash and in the State of Indiana, have invented certain new and useful Improvements in Animal-Traps; and do hereby declare that the following is a full, clear, and exact description thereof, reference being had to the accompanying drawing and to the letters of reference marked thereon making a part of this specification.

The nature of my invention consists in the construction and arrangement of an "animal-trap," as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section; and
Figure 2 is a transverse vertical section of my animal-trap.

My trap is composed of a series of compartments, A, B, and C, one bottom, D, answering for all.

The front box or compartment A is open at both ends, its sides and top being closed.

At the rear end of the box A, in the bottom, is pivoted a treadle, E, which extends to the front end of said compartment, and for a suitable distance into the compartment B.

At the mouth of the compartment A the treadle E is weighted, so that the treadle will be horizontal when nothing is upon its rear end.

The front end of the treadle is, by a rod, G, connected with a gate, H, which is pivoted, at the top, in the entrance of the compartment A, and, when down, inclines downward and toward the rear, as shown in fig. 1. When the treadle is in a horizontal position, this gate is lifted up, giving free access to the trap. When a mouse or other animal enters the trap and passes over or beyond the pivot point of the treadle, it trips the treadle, so as to close the gate.

The lower rear end of the gate is down immediately over or in rear of the pivot point of the treadle, so that the animal cannot pass back over said point to raise the gate again.

The compartment B, which is a continuation of the compartment A, is made of wire-cloth, having, in its center, a semi-cylindrical case, I, placed crosswise on the bottom D.

Said casing is also made of wire-cloth, and the sides and top of the compartment B around said casing braced with metal plates *a*.

The casing I is for the purpose of holding the bait, access being had to the same through an aperture, *b*, in the bottom D.

At the upper front edges of the plates *a* is hinged or pivoted another gate, J, which falls down on the top and rear of the casing I, so that the animal, in passing over the casing, will lift the gate, and the gate fall down behind the animal, preventing it from returning.

The rear end of the wire compartment B is secured to the compartment C, which is a box of any suitable dimension, having a sliding door, K, at its rear end, through which the animal is to be let out.

At the entrance to the box C, where the compartment B is attached to the same, a flue, L, extends a suitable distance within the box C, and in said flue is a gate, M, constructed and operating in precisely the same manner as the gate J, above described, so that, when the animal once passes into the box C, it cannot get out again except when the sliding door K is opened.

Having thus fully described my invention,

What I claim as new, and desire to secure by Letters Patent, is—

The combination and arrangement of the compartments A B C, bottom D, treadle E, rod G, casing I, flue L, door K, and gates H J M, all constructed as described, substantially as and for the purposes herein set forth.

In testimony that I claim the foregoing, I have hereunto set my hand this 7th day of February, 1870.

JOHN J. WOOD.

Witnesses:
MICHAEL HENNEY,
THOS. H. WALLACE.